Oct. 30, 1928.
F. L. WALKER
1,689,705
PROCESS FOR MANUFACTURING PLYWOODS
Filed Aug. 11, 1926
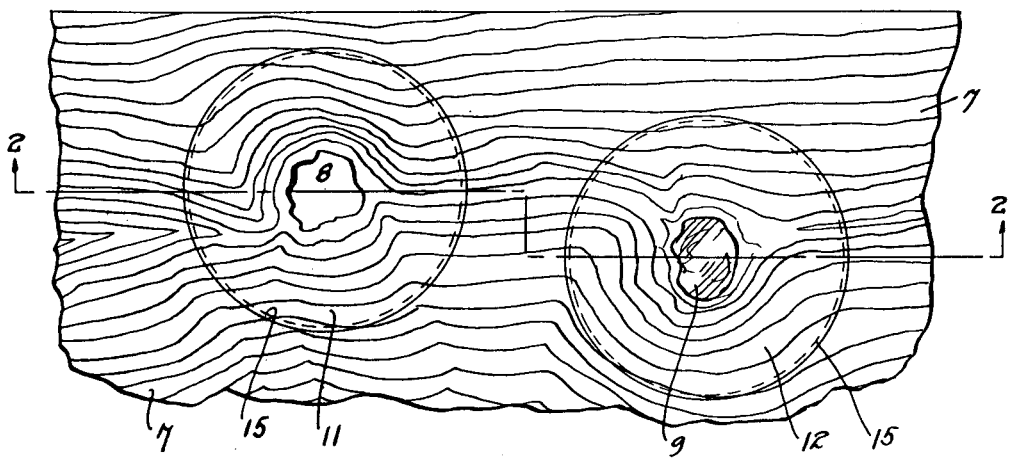
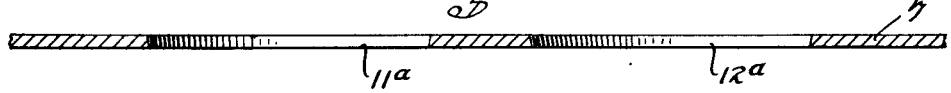
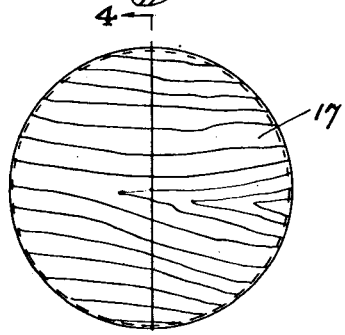
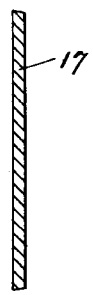
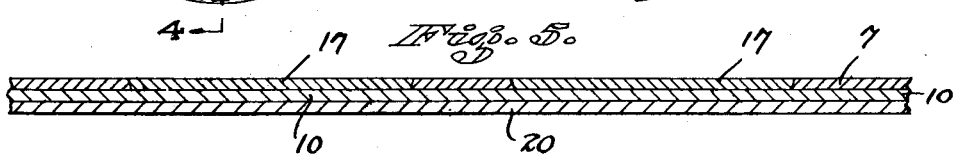
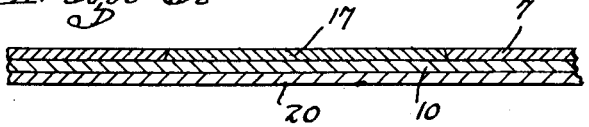
INVENTOR
FLETCHER L. WALKER
BY
ATTORNEYS Patented Oct. 30, 1928.

1,689,705

UNITED STATES PATENT OFFICE.

FLETCHER L. WALKER, OF WESTWOOD, CALIFORNIA.

PROCESS FOR MANUFACTURING PLYWOODS.

Application filed August 11, 1926. Serial No. 128,662.

In making plywood, it has been customary to glue or cement together the desired number of plies to make a veneering board. Subsequent to this step, it has been customary to cut out the knots that may be in the outer ply; this step has been done by making circular kerfs around the knots, leaving circular disks separated from the outer ply.

However, since all plies have been glued together before beginning the removal of the knots, the mentioned disks remain glued to the adjacent ply; the disks therefore could not be readily removed; in fact, they had to be chiseled out.

Obviously, this was a slow process. After the removal of the disks by the chiseling operation, the holes have been filled by knot-free disks cut for the purpose.

It is an object of my invention to provide a quicker and otherwise more satisfactory process for making plywood.

The accompanying drawings will aid in understanding my invention.

Fig. 1 of the drawings is a fragmentary plan view of a ply containing a knot and having a knot-hole.

Fig. 2 is a section taken on the broken line 2—2 of Fig. 1 after circular disks have been removed from the ply shown in Fig. 1.

Fig. 3 is a plan view of a knotless disk employed to fill a hole made by cutting disks from the ply shown in Fig. 1.

Fig. 4 is a sectional view of Fig. 3 taken on line 4—4 thereof; and Fig. 5 is a multiple-ply board made according to my invention.

Fig. 6 is a modified form of a portion of Fig. 5.

The ply 7 shown in Fig. 1 has in it a knot-hole 8 and a knot 9.

According to my invention, disks are cut from the ply 7 before the latter is affixed to another ply, such as the ply 10 shown in Fig. 5.

The disks cut from the ply 7 are numbered 11 and 12 and respectively include the knot-hole 8 and the knot 9. The disks 11 and 12 are circular and are cut out by a tapered, circular, rotating saw shown in my copending application Serial Number 148,497, filed November 15, 1926, and entitled Apparatus for cutting knots out of plywood.

The cutting action of the mentioned saw produces kerfs 15 so that the disks 11 and 12 drop from the ply when the latter is lifted. The removal of the disks 11 and 12 leave tapered holes 11$^a$ and 12$^a$, respectively in the ply 7, as shown in Fig. 2.

The tapered holes 11$^a$ and 12$^a$ are then plugged with knotless, tapered, circular disks 17. The plugging disks 17 are slightly larger than the holes 11$^a$ and 12$^a$ and are readily tapped tightly into place flush with both sides of the ply 7. The ply 7 is then glued or otherwise affixed to the ply 10 shown in Fig. 5. This figure also shows the ply 10 glued to the ply 20.

If desired, the plugging disks 17 may be tapered in the opposite direction to that shown in Fig. 5; the adjacent portions of the ply, of course, would then be correspondingly tapered. This form is shown in Fig. 6, and it will be readily seen therefrom that the tapered disks are very securely held therein by virtue of the direction of the taper.

While I have described one embodiment of my invention, modifications thereof may be readily devised without departing from the spirit of my invention, and it is to be understood that such modifications come within the scope of the appended claim.

I claim:

The steps in the manufacture of ply wood which consists in the removal of a defective portion from a ply, tapering the walls of the opening thus provided, inserting a piece of ply in the opening that conforms therewith, and attaching this ply upon other plies in a manner to cause the larger surface of the inserted piece to contact with the adjacent ply.

FLETCHER L. WALKER.